US009944397B2

(12) United States Patent
Vergnaud et al.

(10) Patent No.: US 9,944,397 B2
(45) Date of Patent: *Apr. 17, 2018

(54) SEAT THAT CAN BE CONVERTED INTO A SLEEPING-BERTH

(71) Applicant: EADS SOGERMA, Merignac (FR)

(72) Inventors: Franck Vergnaud, Saint Medard D'Aunis (FR); Didier Guinot, La Rochelle (FR); Gabriel Martin, Echillais (FR)

(73) Assignee: EADS SOGERMA, Merignac (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,348

(22) Filed: Oct. 11, 2016

(65) Prior Publication Data

US 2017/0029117 A1     Feb. 2, 2017

Related U.S. Application Data

(62) Division of application No. 13/513,720, filed as application No. PCT/EP2010/068635 on Dec. 1, 2010, now Pat. No. 9,533,765.

(30) Foreign Application Priority Data

Dec. 2, 2009   (FR) ..................... 09 58590

(51) Int. Cl.
    *B64D 11/06*   (2006.01)
    *B63B 29/04*   (2006.01)
    *B61D 31/00*   (2006.01)

(52) U.S. Cl.
    CPC .......... *B64D 11/0641* (2014.12); *B63B 29/04* (2013.01); *B64D 11/06* (2013.01);
    (Continued)

(58) Field of Classification Search
    CPC ............ B64D 11/0641; B64D 11/0601; B64D 11/0604; B64D 11/06
    See application file for complete search history.

(56) References Cited

U.S. PATENT DOCUMENTS

| 4,382,628 A | 5/1983 | Palmgren |
| 5,740,989 A | 4/1998 | Daines |

(Continued)

FOREIGN PATENT DOCUMENTS

| WO | 2009120308 | 10/2009 |
| WO | 2010084468 | 7/2010 |

OTHER PUBLICATIONS

Third Party Observation, dated Mar. 4, 2015, in the corresponding European Patent Application No. 10787401.8.

*Primary Examiner* — Jessica B Wong
(74) *Attorney, Agent, or Firm* — Young & Thompson (57) ABSTRACT

A block of two seats side by side which can be converted individually between a chair configuration and a horizontal flat bed configuration, the longitudinal axes of two of the seats in the bed configuration converging towards a point situated in front of the seats at a distance such that the foot areas in front of the seats in the bed configuration are superposed. Bed planes of the two seats of the block are vertically offset and extended by rest surfaces of the foot areas arranged in a column arranged between the seat backs of the seats of a block situated in front, making it possible to reduce the seat pitch while not affecting comfort, and allowing an improved cabin layout for transporting passengers.

19 Claims, 9 Drawing Sheets

(52) U.S. Cl.
CPC ...... *B64D 11/0601* (2014.12); *B64D 11/0604* (2014.12); *B64D 11/0643* (2014.12); *B61D 31/00* (2013.01); *B63B 2029/043* (2013.01)

(56) References Cited

U.S. PATENT DOCUMENTS

| | | | |
|---|---|---|---|
| 5,992,798 | A | 11/1999 | Ferry |
| 8,118,365 | B2 | 2/2012 | Henshaw |
| 8,690,254 | B2 | 4/2014 | Cailleteau |
| 9,533,765 | B2 * | 1/2017 | Vergnaud ............... B64D 11/06 |
| 2007/0241235 | A1 | 10/2007 | Atchison |
| 2007/0246981 | A1 | 10/2007 | Plant |
| 2009/0166470 | A1 | 7/2009 | Dryburgh et al. |
| 2010/0252680 | A1 | 10/2010 | Porter |
| 2010/0308164 | A1 | 12/2010 | McKeever |
| 2011/0309662 | A1 | 12/2011 | Veneruso |
| 2012/0305705 | A1 | 12/2012 | Vergnaud et al. |

* cited by examiner

SEAT THAT CAN BE CONVERTED INTO A SLEEPING-BERTH

BACKGROUND OF THE INVENTION

Field of the Invention

The present invention belongs to the field of fitting out cabins of means of passenger transport.

More particularly, the invention relates to a seat which can be converted into a bed which is particularly suited to the requirements of passenger cabins, for example aircraft cabins.

Description of the Related Art

Within the field of transporting people, it is known to offer a seat which can be converted during the journey to passengers who have to make a relatively long journey so that the passenger can choose between a seated position and a relaxed position, where the relaxed position can correspond to a lying flat position.

A chair which can be converted into a bed proves to be a particularly advantageous solution when the length of the journey makes it relatively uncomfortable to remain in a seated position throughout the journey and when the journey is nevertheless sufficiently short not to justify individual cabins.

This type of solution is found, for example, in the cases of long-haul aeroplanes where a journey includes just one period of sleep and where there is often a very limited amount of space available.

This is also the case for some journeys by train, coach or boat, depending on the length of the journey.

It is known to produce chairs for which a combined movement of the seat cushion, the seat back and a leg rest positioning these different parts of the chair substantially horizontal in a same plane makes it possible to form a bed which may be extended by a bench fixed at the same height as the bed plane. Such chairs which can be converted into a flat bed offer the desired comfort but, when a large number of them are installed in a passenger cabin, they entail a longitudinal distance between the seats (the cabin seat pitch) which is at least equal to the length of the bed obtained, and usually a greater distance when an occupant of a seat adjacent to another seat needs to access an aisle which is not next to them.

This type of comfort, which requires a lot of space, is hence reserved for luxury cabins and means that the number of seats which can be installed in a given cabin length is limited.

In order to increase the number of seats in a cabin whilst reducing the distance between seats, it is also known to limit the movements of the parts of the seat so as to bring the seat into a mean horizontal or highly inclined position but with the angles between the different parts (seat cushion and seat back, on the one hand, and seat cushion and leg rest, on the other hand) being maintained so as to obtain a profile in the shape of a flattened Z.

The saving in the length of the seat in this so-called "relaxed position" allows a cabin layout with a reduced seat pitch compared with the flat bed solution but it is less comfortable and is generally unsatisfactory for passengers in business or first class.

Another known solution for reducing the seat pitch in the case of a flat bed or a relaxed position consists in arranging a space beneath the seat in front of another seat, into which the occupant of the seat behind puts their feet.

However, this solution proves to be detrimental to comfort as it does not allow passengers to lift up their feet enough and, in the case of a flat bed, means that the bed is not horizontal but substantially inclined to the horizontal.

The fierce competition in the field of transport thus creates a difficult compromise between a cabin with seats having an integral and horizontal flat bed, which is commercially very attractive, and a cabin having more seats without such a flat bed, which is thus more profitable economically but less attractive commercially.

SUMMARY OF THE INVENTION

The present invention relates to the fitting out of a cabin for transporting passengers, in which the seats can be converted into flat beds and in which the seat pitch is substantially less than the length of the bed, for example equivalent to that which would be needed for seats having a relaxed position.

Such a result is obtained by implementing the seats of the invention which are arranged in blocks of two seats.

In a block of seats of the invention having at least two seats, each seat can be converted individually by a relative movement of elements of the seat between a chair configuration in which an occupant of the seat is in a seated position and a bed configuration in which the elements of the seat are placed so as to form a bed plane and in which an occupant of the seat is stretched out substantially flat and substantially horizontally.

The two seats in question of a block are arranged side by side and oriented substantially in the same direction, and:

- each seat is associated with a foot space or area situated in front of the seat when the seat is in the bed configuration and in the extension of the bed plane, which space corresponds to the position of an occupant of the seat in the bed configuration;
- the longitudinal axis of each of the seats in the bed configuration converges towards a convergence point situated in a vertical plane of symmetry of the block in front of the seats such that the foot areas of the two seats of the block are at least partially superposed in a vertical projection;
- when the two seats are in the bed configuration, the bed planes of the two seats are at different heights relative to the floor of a cabin in which the block would be installed.

A bed part thus extends towards the front of the seat beyond the surface obtained by the relative movement of the elements of the seat enabling the length of the seat in the bed configuration to be reduced to a length L1 which is less than the length L0 of the bed, and interference between the foot areas of the two seats in the bed position of a same block is avoided by the vertical offset of the two bed planes.

In order to compensate for the reduced length of the seats in the bed configuration, a separating space is arranged in a rear part of the block substantially between the seat backs of the two seats, when the two seats are in the chair configuration.

The separating space is occupied by a substantially vertical column, this column covering in a vertical projection foot areas of the seats of a similar block which would be placed behind the block in question, in the same direction and substantially with the same axis, at a separating distance between the two blocks, the pitch X of the blocks in a layout, which is less than a desired length L0 of the bed of the similar block behind. The space corresponding to this column thus makes it possible to create, between the two seats of a block in front of a block with one seat in the bed configuration, a space for extending the bed of the block situated behind by the desired length.

Considering the height of the seat cushion of the seats in the chair configuration as the reference height above the floor, the vertical offset of the two bed planes of the seats of a block is obtained by one of the bed planes in the bed configuration above the seat cushion in the chair configuration, or by at least one of the bed planes below the seat cushion in the chair configuration for at least one of the seats of the block.

To distribute the vertical offset between the bed planes and limit the amplitudes of the vertical movements of the seats, the bed plane of one of the seats is preferably above a vertical position of the seat cushions of the seats in the chair configuration and the bed plane of another of the seats is below the position of the seat cushions.

So that each bed of a block situated behind a block in question, in the same direction and substantially with the same axis, has an independent bed surface, the column has two foot areas which are separate from each other and open in the direction facing the rear of the block.

Each foot area comprises a rest surface substantially in a horizontal plane, and the foot areas are offset vertically so that one of the rest surfaces is situated level with one of the bed planes of the block so as to be situated in the extension of the bed plane having the same height in the block situated behind the block in question, and another of the rest surfaces is situated level with the other bed plane in question so as to be situated in the extension of this other bed plane of the block situated behind the block in question.

In an embodiment, the bed plane of a seat in the bed configuration is determined by the seat cushion of the said seat, the seat back of the said seat, a leg rest of the said seat and/or one or more movable panels, the plane being extended by a rest surface of a foot area of a similar block which would be placed in front of the block in question or, for the first block of a line of blocks, of an isolated column having characteristics similar to the column of such a similar block, the seat cushion, the seat back, the leg rest, the movable panel or panels and the rest area being aligned substantially horizontally and in a same plane to form the bed.

In another embodiment, the bed plane of a seat in the bed configuration is determined by the seat cushion of the said seat, the seat back of the said seat and a leg rest of the said seat, the said leg rest forming at least partially a rest surface of a foot area which penetrates a hollow space of the column of a similar block which would be placed in front of the block in question or of an isolated column having similar characteristics to the column of such a similar block, the said seat cushion, seat back and leg rest being aligned substantially horizontally and in a same plane so as to form the bed. In this embodiment, the structure of the column is simplified by limiting the number of partitions, which also makes it simpler to maintain and clean.

In order to ensure that the foot areas, in particular the foot area of the lowest bed, have a sufficient volume and in particular a sufficient height of approximately 300 mm in order to satisfy the comfort of the passengers, the bed planes of two adjacent seats are vertically offset by a distance of approximately 330 mm when the seats are both in the bed configuration.

This sufficient height in general makes it possible to limit the amplitude of the up and down movements of the seats and simplify the mechanical parts responsible for permitting the movements in question.

The column of a block, the dimensions of which are imposed at least by those of the foot areas which need to be available, forms a large volume which is not used by the foot areas and which advantageously makes it possible to integrate relatively easily technical equipment for the block and/or comfort or entertainment equipment which can be used by the occupants of the seats of a block situated behind the block in question.

The separation between two adjacent seats advantageously comprises a closed structure between two seats, which closed structure comprises a side trim panel on a side of the closed structure corresponding to the seat in which the seat cushion is lowered during the conversion into the bed position, the said side trim panel being removable when the said seat in which the seat cushion is lowered is in the bed configuration. It is thus possible to access the internal volume of the closed structure and the equipment installed there without having to disassemble mechanical parts of the seat.

In order to improve the storage capacities of a block, the block advantageously comprises, in its rear part, a recess forming a storage space between the level of a floor to which it is intended to fix the block and the height of the lowest bed, running across the width of the said block. Such a storage space, with a width corresponding to the width of the block, makes it possible to place long objects which are usually difficult to stow.

In an embodiment, a block comprises exactly two seats with convergent longitudinal axes.

In another embodiment, a block comprises exactly three seats, two adjacent seats of the three seats of the block having convergent longitudinal axes, the third seat having a longitudinal axis substantially parallel to the longitudinal axis of the seat closest to it in the block, the said seat closest to it being a seat having a seat cushion which moves up when the seat is converted into the bed configuration.

Thus, by arranging a block of two seats or a block of three seats according to the invention, it is possible to optimize the layout of a given vehicle in which the cabin has limitations in terms of its geometric dimensions, in particular its width.

The invention also relates to a cabin or a part of a cabin for transporting passengers having at least one line of at least two blocks of seats, in which blocks each seat of a block of seats can be converted individually, by a relative movement of the elements of the seat, between a chair configuration in which an occupant of the seat is in a seated position and a bed configuration in which the elements of the seat form a bed plane and in which an occupant of the seat is stretched out substantially flat and substantially horizontally, in which blocks the seats are arranged side by side and oriented substantially in the same direction, the at least two blocks being arranged one behind the other in the same direction of orientation of the seats and separated, in a direction of the line of blocks, by a pitch X characterizing the distance between a reference point of each of the blocks.

In the cabin of the invention, for each of the seats of a block, following another block which precedes it in the direction of orientation of the seats, in the bed configuration a bed plane of each seat is extended by a foot area situated in front of the seat, inside the block preceding it, in a built-in space, or column, between the seat backs of the seats of the preceding block.

Furthermore, in order to prevent interference between the spaces occupied by the beds of a block in the column of the block preceding it in a line, the bed planes of the seats of a block in the bed configuration are at different heights above a floor of the cabin, and in order to make it easier for a passenger occupying the highest bed to move between their seat and the aisle of the cabin, a seat of a block with a bed plane situated vertically closest to the floor of the cabin is situated on the side of the block bordered by an aisle.

The cabin thus offers passengers beds with a length greater than the seat pitch, which makes it possible to increase the number of seats for a given cabin length or to reduce the length of the cabin for a number of seats installed.

In order to adapt to the limitations of the layout of a given cabin or to provide beds with different dimensions, the pitch X of the blocks of at least one line of blocks is modified to form beds of different lengths L0 in the bed configuration, depending on the block in question.

The frontmost block in a line of blocks is advantageously preceded, at the front in a direction of orientation of the seats of the said line, by a built-in column similar to a column of a block so as to have the same sleeping comfort on the seats of a first block at the front of a line of blocks by employing a block according to the other blocks employed in the line of blocks and generally in the cabin.

A vehicle for transporting passengers, in particular a land transport vehicle or a sea transport vehicle or alternatively an air transport vehicle, featuring such a cabin makes it possible to provide, with an improved passenger density, the degree of comfort of an actual flat bed, in particular when the journey length does not justify, in terms of the service offered, separate passenger cabins.

BRIEF DESCRIPTION OF THE DRAWINGS

Description of non-limiting embodiments of the invention is made with reference to the drawings in which, schematically:

FIGS. 2a and 2b show perspective views, from behind in FIG. 2a and from the front in FIG. 2b, of the set of three blocks in FIG. 1a;

DETAILED DESCRIPTION OF THE PREFERRED EMBODIMENTS

The present invention relates to a seat 3 which can be converted between a chair configuration in which an occupant of the seat is in a seated position and a flat bed position in which an occupant of the seat is stretched out substantially flat and substantially horizontally.

More particularly, the invention relates to a side-by-side arrangement of at least two seats which can be converted individually into flat beds, referred to as block 2, and relates to a means of passenger transport, for example an aeroplane, in which a cabin 1 or part of a cabin employs at least two blocks arranged in a line, one behind the other.

In the present description and the associated drawings, a reference number designating a same or similar element will, where appropriate, be followed for clarification purposes by the suffix "a" when it refers to the same element in a "chair" configuration of the seat, by the suffix "b" when it refers to the same element in a "relaxed" configuration of the seat, and by the suffix "c" when it refers to the element in a "bed" configuration of the seat, these different configurations being detailed in the following description. To avoid confusion to which a reference number addresses, the suffix a, b and c are between brackets when used in the text and on the drawings.

For example, a seat generally has the reference number 3, the reference number 3(a) pointing a seat in the chair configuration, the reference number 3(b) pointing the same or a similar seat in the relaxed configuration and the reference number 3(c) pointing the same or a similar seat in the bed configuration.

Figure 1A:
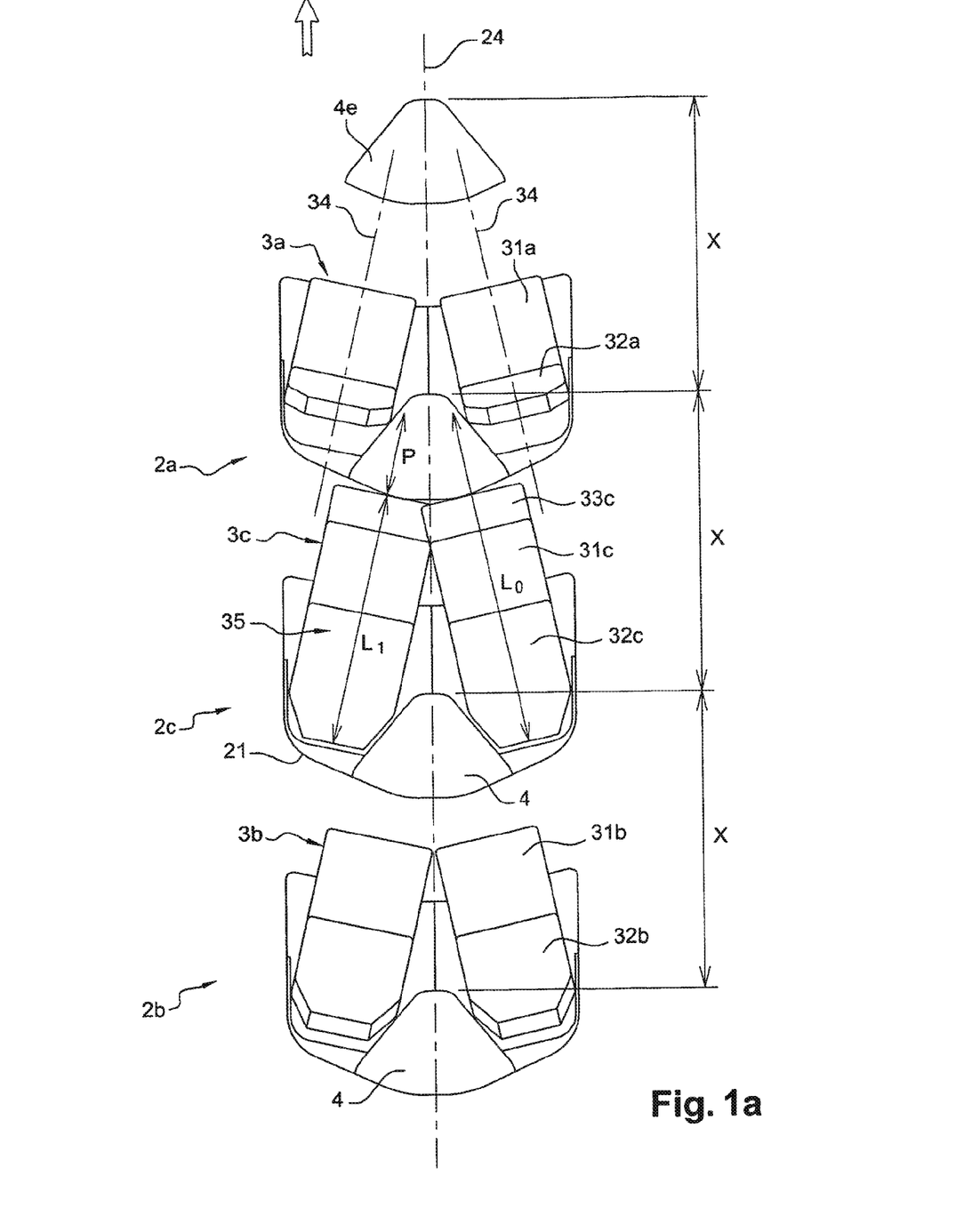
FIG. 1a shows a view from above of a set of three aligned blocks of two seats according to the invention in a passenger cabin according to a first embodiment.

FIG. 1a shows in a view from above three blocks 2, of two seats in this example, aligned one behind the other in a row of blocks which may comprise any number of blocks in a similar arrangement, depending on the dimensions of the cabin.

Although not obligatory, the seats are usually oriented with the occupant of a seat facing the front of the cabin in the direction of travel, symbolized by the arrow in the drawing, and this direction convention will be used in the following detailed description.

In the present description, unless stated otherwise, generally the terms "front", "rear", "high", "low", "above", "below", "forwards", "backwards", "up", "down" etc. have the meaning that would be understood by an occupant of the seat relative to their position when seated in the chair configuration.

In FIG. 1a, the seats 3a of the frontmost block 2a are illustrated in the chair configuration, the seats 3c of the middle block 2c are illustrated in the flat bed configuration and the seats 3b of the rear block 2b are illustrated in a relaxed configuration corresponding to an intermediate setting of the seats between the position of the chair configuration and the position of the flat bed configuration.

In a known manner, a seat 3 comprises mainly a seat cushion 31, a seat back 32 and possibly a leg rest 33.

In a likewise known manner, in the chair configuration of the seat 3a, the seat back 32a is straightened into a position close to the vertical and the leg rest 33, which cannot be seen in the view from above of the seats 3a of the front block 2a, is folded down so as to reproduce the classical configuration of a seat or chair.

In the flat bed configuration of the seat 3c, the seat cushion 31c, the seat back 32c and the leg rest 33c are in a substantially horizontal position and aligned so as to form a bed plane 35.

Lastly, in the relaxed configuration of the seat 3b, the seat cushion 31b and the seat back 32b form an angle facing upwards, the seat back being inclined backwards, and where appropriate the seat cushion 31b and the leg rest 33 form an angle facing downwards, so that the seat 3*b* has a profile in the shape of a more or less open flattened Z.

Each seat has a longitudinal axis 34 corresponding in the view from above to the extension of a vertical plane of symmetry of the seat 3, and a block 2 has a longitudinal axis 24 corresponding in the view from above to the extension of a vertical plane of symmetry of the block, the two seats 3 of a block being themselves arranged side by side in the block with a similar longitudinal position in the block 2 and substantially oriented in a same direction.

Figure 1B:
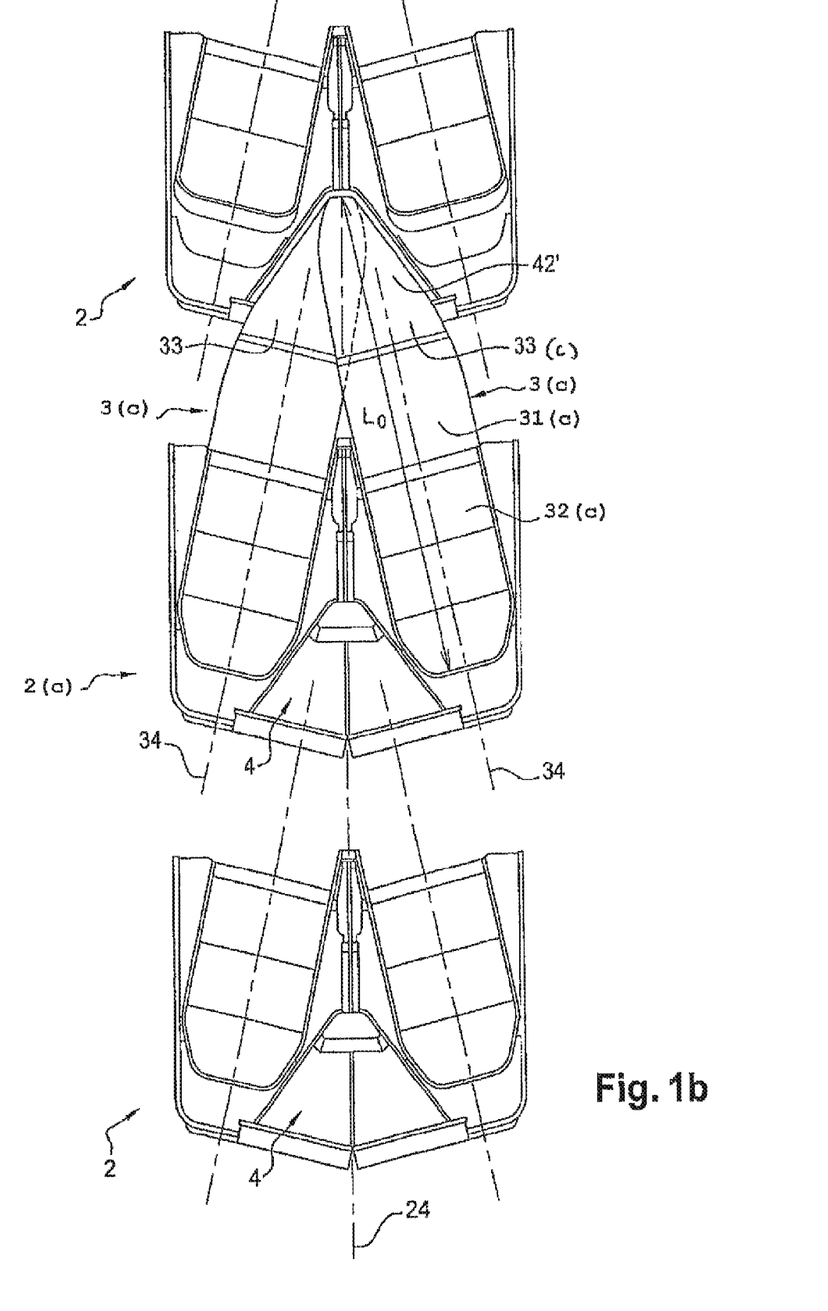
FIG. 1b shows a partially exploded view from above of a set of two aligned blocks of two seats according to the invention in a second embodiment.

However, as can be clearly seen in FIG. 1*a* or FIG. 1*b*, the seats 3 have the feature of not being oriented in exactly the same direction and the longitudinal axes of each of the two seats of a block 2 converge towards the axis of the said block in front of the seats.

In the preferred illustrated embodiments in FIGS. 1*a* and 1*b*, the arrangement of the seats of a block is symmetrical and the axes of the two seats of the block converge in practice, as seen from above, towards a same point of convergence situated in front of the seats, substantially in the vertical plane of symmetry of the block.

This convergent configuration is associated with a separating space between the two seats 3 of a corresponding given block 2 between the seat backs of the said seats at the location of a column 4 integrated into the structure of the block 2.

The column 4 is situated substantially at the point of convergence of the longitudinal axes 34 of the two seats 3 situated in a block immediately in the line of blocks behind the block 2 in question in a position where the distance between the said longitudinal axes is reduced.

More particularly, the convergence of the longitudinal axes 34 of the two seats 3 is such that, when a seat 3 of a block situated just behind the block 2 in question is placed in the flat bed configuration, the column 4 is situated, when viewed from above, on the one hand substantially in the extension of the bed formed, and on the other hand in the region of the feet of an occupant of the seat in the bed configuration.

Thus, as illustrated in FIGS. 1*a* and 1*b*, the column 4 integrated into a block is in the extension of the bed formed by each of the two seats 3*c* of the block 2*c* situated immediately behind in the line of blocks.

In an embodiment corresponding to the case illustrated in FIG. 1*a*, a feature of the seats of the invention is that the length L1, termed the base length, of the bed surface formed by the seat back 32*c*, the seat cushion 31*c* and the leg rest 33*c* of a seat, in the longitudinal direction of the bed corresponding substantially to the direction of the longitudinal axis 34 of the seat, is less than a desired length L0 for the flat bed, and that a dimension of the column 4 in the directions of the axes 34 of the seats 3 of the block 2 situated behind the said column, termed the depth P of the column, corresponds substantially to the additional length which must be added to the base length L1 to obtain the desired length L0 for the bed.

The column 4 of a block thus defines, in front of each seat 3 of the block situated immediately behind, a space associated with each seat in front of the seat in question in the bed configuration, termed the foot area 41, into which, subject to the arrangements detailed below, the feet of an occupant of the seat in the flat bed configuration can be introduced if required by the size of the person.

It will thus be understood that the column 4 is, at least in the extension of each flat bed, on the one hand hollow and on the other hand open towards each seat 3 of the block 2 situated behind.

Figure 2A:
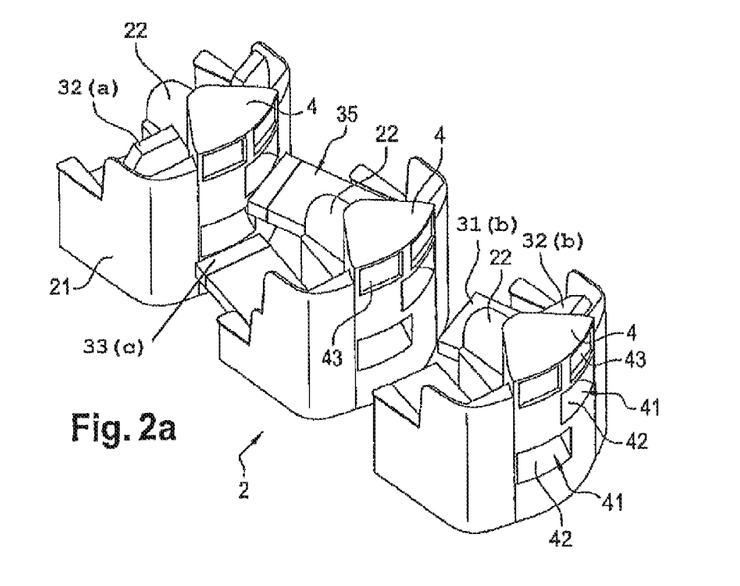

Furthermore, so that a passenger can rest their feet, a substantially horizontal rest surface 42, possibly with a suitable padding for this purpose, is positioned in the extension and at the same height as the other flat bed surfaces, as illustrated in FIG. 2*a*.

It will also be understood that the depth P in question here is an internal dimension of the hollow part of the column 4, the walls of which necessarily have a certain thickness, even if this thickness may be relatively small, given the limited loads to which the structure of the column 4 is subjected, and that the height of the rest surface 42 is fixed a priori.

Given their geometrical arrangements and the fact that the axes 34 of the two seats converge, when viewed from above, as illustrated in FIG. 1*a*, the foot areas 41, corresponding to the two seats of the block situated behind, of a same column 4 are superposed at least partially in the region of an interference zone, especially when the said foot areas are sufficiently wide to guarantee the comfort of the occupant of the seat, both of whose feet must be able to simultaneously reach the end of the bed.

In order to overcome the apparent conflict between the volumes which determine the foot areas 41 of a column 4, another feature of the invention relates to the relative vertical positions of the flat bed planes 35 of the two seats 3 of a same block 2.

With reference to FIG. 2*a* which illustrates the set of three blocks in FIG. 1 in a perspective view partially from behind, it will be noted that the foot areas 41 of a column 4 of a block 2 are vertically offset such that each seat of the block situated behind has a dedicated foot area 41 totally isolated from the foot area of the other seat.

This vertical offset makes it possible to make use of the entire possible depth and width of the column 4 for each foot area 41.

So that the vertically offset foot areas 41 can be used by the seats 3 in the flat bed position, the bed plane 35 of each seat 3 is placed at the same height as the rest surface 42 of the foot areas 41 which is situated in its extension, in other words the bed planes 35 of the two seats 3 of a same block 2 in the flat bed position are vertically offset.

When the seats 3 of the invention are employed so as to be converted from the chair configuration, in which the seat cushions 31 of the seats 3 are a priori situated substantially at the same height with respect to a floor of the cabin, into a flat bed configuration, one of the seats 3 of the block 2 is subjected to an overall downward movement, whereas the adjacent seat of the said block is subjected to an overall upward movement.

These downward and upward movements are in absolute terms relative movements between the two seats, the important result being to obtain the desired vertical offset with respect to the floor between the final reclined positions and the vertical alignment of each bed plane 35 with the corresponding rest surface 42.

In practice, to prevent large-amplitude vertical movements for one of the seats and also to prevent one of the beds being too high or too low, it is advantageous to share the vertical displacement to be performed between the two seats of the block.

The movements of a seat 3 of a block 2 are preferably independent of the movements of the other seat of the block.

In order to allow the downward displacement of the seat cushion 31 of the seat which is lowered during the conversion from the chair position into the bed position, protective trims 36 situated beneath the seat cushion are made to be movable so that they can fold away when the seat cushion is displaced.

Figure 5:
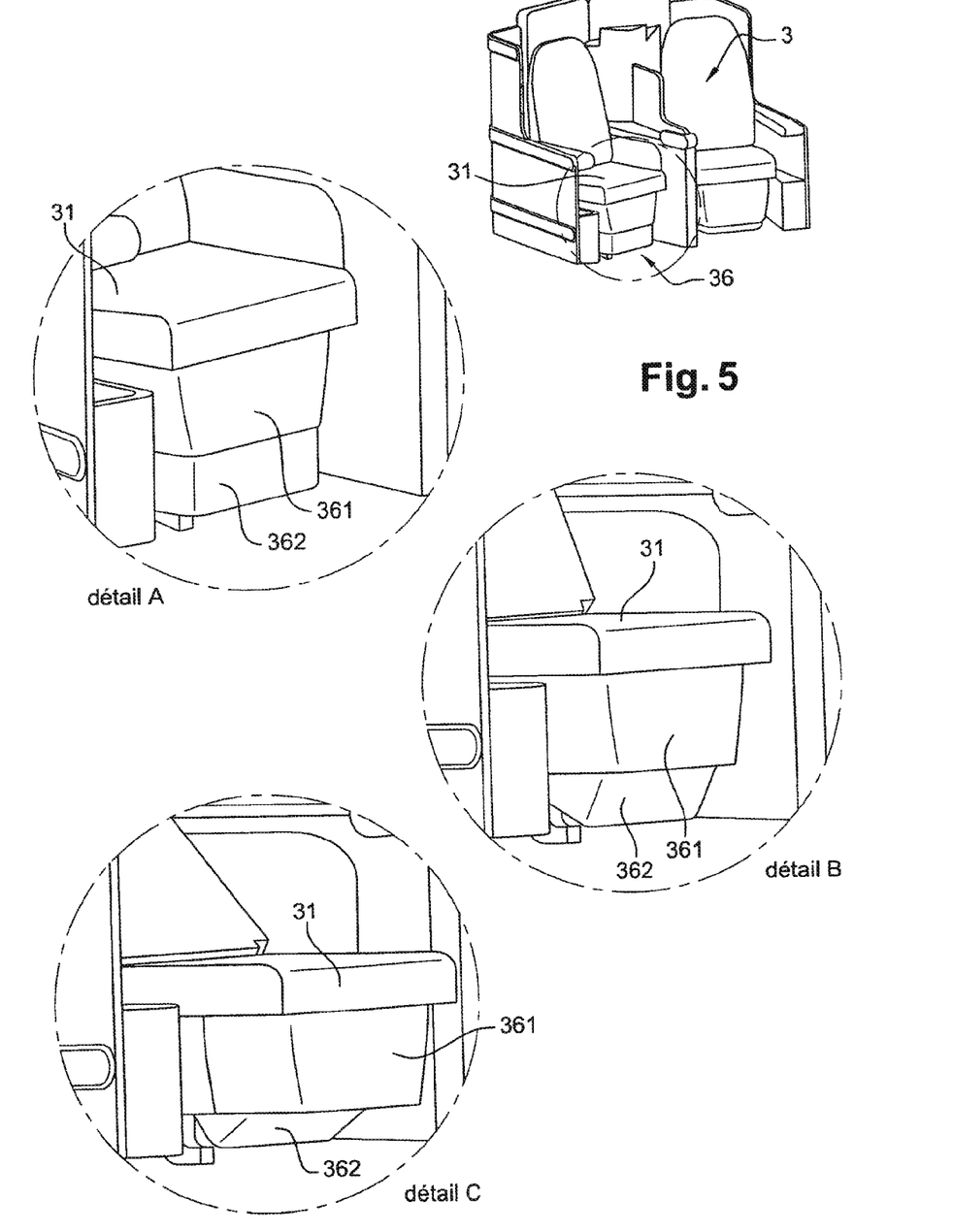
FIG. 5 shows details of the arrangement of movable protective caps of a seat with the seat cushion lowered into the bed configuration, illustrated in three positions of the seat cushion.

As illustrated in FIG. 5, in addition to their aesthetic purpose the protective trims 36 have a safety role, preventing objects, clothing or people from getting stuck by the different moving parts or the mechanisms performing the movement during a conversion. So that the protective trim 36 correctly performs its function in all the positions of the seat cushion, a lower part 362 of the trim situated beneath the seat cushion is articulated on an upper part 361 of this trim.

When the seat cushion 31 is in the chair position, in other words in the upper position for the chair in question, as in the detail a of FIG. 5, the lower part 362 of the trim is held down, for example by spring means or any suitable elastic element, and when the seat cushion is displaced into the bed position, in other words the lower position for the chair in question, the said lower part, articulated on the upper part 361 of the trim 36 or on structural elements of the seat cushion, is gradually pushed back (detail b and detail c of FIG. 5) so that it does not obstruct the movement of the seat 3 whilst continuing to protect the areas situated beneath the seat cushion 31.

In an embodiment, considering a standard value of the height of the seat cushion of a chair above the floor of the cabin of approximately 430 mm, the bed plane 35 of the seat which assumes the lowest position is lowered by 130 mm so as to maintain the bed plane of this seat at approximately 300 mm above the floor of the cabin, and the bed plane of the seat which assumes the highest position is raised by 200 mm, i.e. is 330 mm above the lowest bed plane, so as to create a foot area 41 which is at least 300 mm high for the lowest foot area, given the required thicknesses for the panels and padding.

The necessary movements of the different parts of the seats are performed by any device having kinematics suitable for the desired movements and combinations of movements.

The desired vertical movement is, for example, obtained either by the same device used for the movements of the parts of the seat 3 (seat back 32, seat cushion 31 and leg rest 33) in order to effect the conversion between the chair configuration and the bed configuration, or is obtained by a separate device from the device which moves the parts of the seat 3 relative to one another, for example a mechanism dedicated to the vertical movement such as a telescopic column or a scissor linkage supporting the seat cushion and associated with an actuator (not shown in the drawings).

The different movements are advantageously performed by one or more electric actuators integrated into the seat and which are capable of being controlled by the occupant of the seat.

In practice, the vertical movement of a seat 3 must be performed in order to prevent the mechanical interference that could occur between the two adjoining seats of a block 2 during the change into the flat bed configuration, in particular in the region of the frontmost part of the seat, for example the seat cushion 31 or the leg rest 33 when a leg rest is used.

Where necessary, each seat 3 is provided with movement limiters in the form of mechanical stops or with an actuator control logic so as to prevent combinations of movements of moving parts of the seats which could cause mechanical interference.

The description of a preferred exemplary embodiment may have alternatives within the knowledge of a person skilled in the art without going beyond the scope of the present invention.

For example, a seat may not have an intermediate relaxed configuration between the chair configuration and the flat bed configuration, which makes it possible to simplify the kinematics and the means for controlling the movements of the seat 3 or, on the contrary, so that the occupant of the seat has as many possible settings as possible, may have a plurality of intermediate positions and its position may even be continuously adjustable between the extreme positions or between the chair configuration and an intermediate position.

In an embodiment, the seat 3 does not comprise a leg rest 33 or has a leg rest with reduced dimensions. The said seat mainly comprises a seat cushion 31 and a seat back 32, as detailed above, and possibly the leg rest with reduced dimensions, which form a flat bed part. In this embodiment, if a space remains open between a front edge of the seat cushion 31 or the leg rest in the bed configuration and the foot area 41, the said open space is closed by a movable panel which is not shown but is functionally equivalent to the leg rest 33 in the bed configuration position.

Such a movable panel is stored, when the seat is in the chair configuration, for example beneath the seat cushion 31 of the seat or in the column 4 or in the foot area 41, or alternatively in a bench or partition. The said movable panel is, for example, a sliding one or is articulated or alternatively detachable and it may result from the assembly of panels which, when arranged in the deployed position, complete the flat bed surface 35.

In another embodiment, the leg rest on the contrary has a greater length so that, in the bed position, it extends at the front of the seat 3 inside the hollow space of the column 4 in the foot area 41 and forms the part of the bed plane extending the seat back and the seat cushion so as to obtain the desired length for the bed.

Figure 2B:
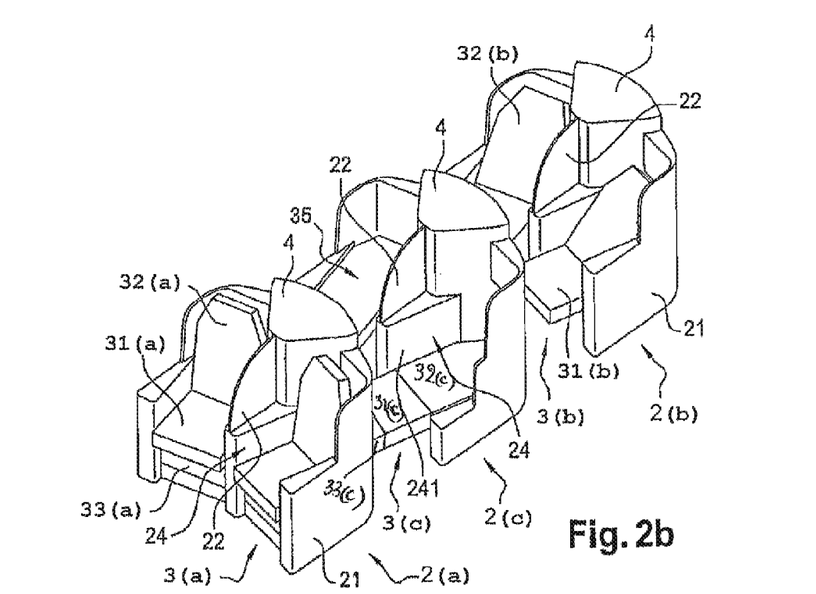
Figure 2C:
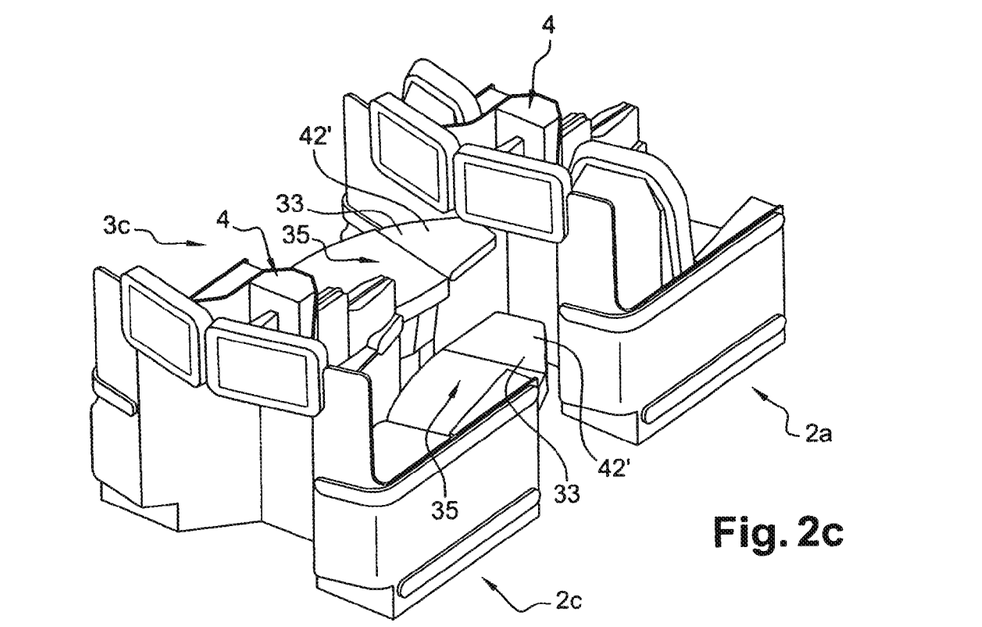
FIGS. 2c and 2d show perspective views from behind of the set of two blocks in FIG. 1b, in the bed configuration in FIG. 2c and in the chair configuration in FIG. 2d.
Figure 2D:
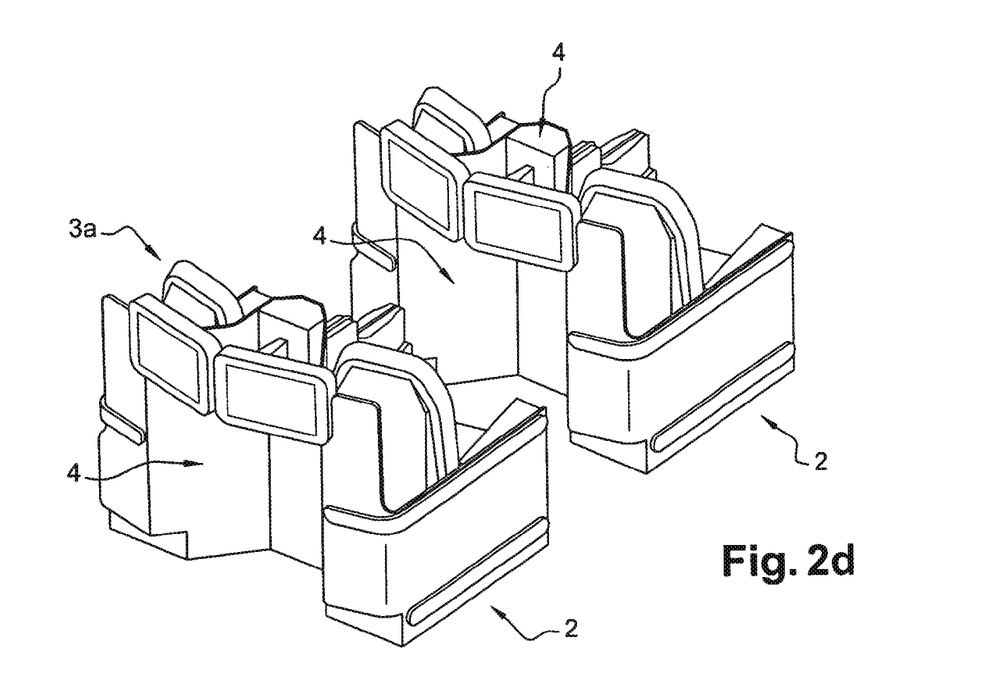

In this case, illustrated in FIGS. 1b, 2c and 2d, the leg rest 33 comprises a rest surface 42' for the feet of the occupant of the bed, which rest surface 42' replaces the rest surface 42 integrated into the foot area 41 of the above-described embodiment. As in the above-described embodiment, the bed planes 35 are vertically offset so that the rest surfaces 42' of the two seats 3c, in practice the leg rests 33, are at least partially superposed in the bed position in the column 4.

In this embodiment, the hollow space of the column 4, which is open on the rear side of the block 2, does not necessarily comprise integrated rest surfaces for the feet, or only comprises reduced surfaces (an option which has not been illustrated) and the said hollow space no longer, as illustrated in FIGS. 2c and 2d, comprises partitions which can obstruct the deployment of the leg rest 33 during the conversion.

In order to better separate the dedicated spaces for each occupant of a seat, partitions (not shown) may, however, be arranged in the hollow space of the column 4 as long as these partitions do not interfere with the leg rests.

In an embodiment which has not been illustrated, the orientation of the axis 34 of a seat is modified depending on the configuration in which the seat is placed.

For example, the axis 34 of the seat is oriented parallel to the axis 24 of the block when the seat is in the chair configuration or in the relaxed configuration, and the axis 24 of the seat is oriented so as to converge towards a point of the axis of the block as described above when the seat is in the bed configuration in order to take advantage of the column 4 of the block situated in front. The orientation of the axis 34 of the seat is changed, for example, by rotation of the seat cushion 31 during the conversion into or from the bed configuration.

As already specified, the orientations of the blocks 2 may differ from the direction of travel of the vehicle, in particular the blocks or some of the blocks of a cabin may be oriented with the front face of the blocks facing the rear of the vehicle, or may be more or less further away from the axis of the vehicle in order to meet specific installation constraints.

The limitations of these orientations are above all dictated by comfort reasons and possibly by safety or legal reasons, the benefit of the invention being obtained by the arrangement in a line of at least two blocks of seats as illustrated in the different figures.

In a preferred embodiment corresponding to the cases illustrated in FIGS. 2a to 2d, a block 2 of two seats comprises an outer shell 21 which forms, with the seat cushion 31, the seat back 32 and the column 4, the visible part of the block.

This shell 21, which is for example made from composite materials because of the possibilities afforded by these materials in terms of shapes that can be formed with advantageous rigidity and mass, takes the form of a single part or an assembly of parts and encloses the mechanisms that perform the movements of the elements of the seats for aesthetic reasons and for the safety of the occupants of the seats.

The volumes of the column 4 in which the foot areas 41 are arranged and which are not occupied by the said foot areas are advantageously used to form volumes for stowing personal effects of the occupants of the seats or for the installation of essential or auxiliary devices of the seat such as power supplies for the seat actuators and their safety devices, or such as comfort-providing equipment, individual lighting and air conditioning for example, or entertainment equipment for the occupants of the seats, in particular video screens 43 as illustrated in FIG. 2, or alternatively storage spaces.

Because the foot area of the lowest bed is situated substantially above the floor of the cabin in which the blocks 2 are fixed, it is advantageous to form, in the lower part at the rear of the block, a forward-directed recess, the height of which is less than that of the lowest bed, which determines a volume that runs across the block laterally.

Figure 4A:
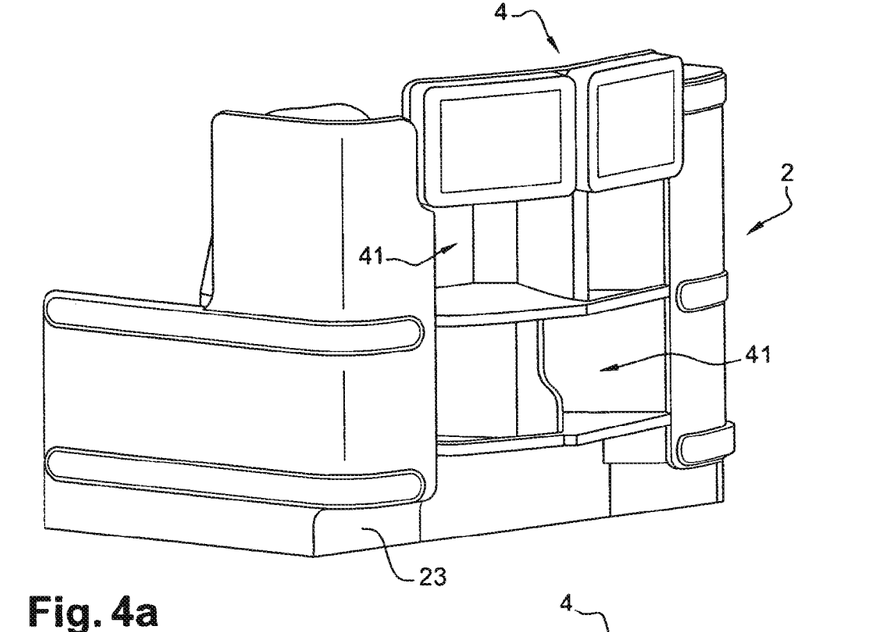
FIGS. 4a and 4b show perspective views of a block configured to form a storage compartment for long objects, from behind in FIG. 4a and from the side in FIG. 4b.
Figure 4B:
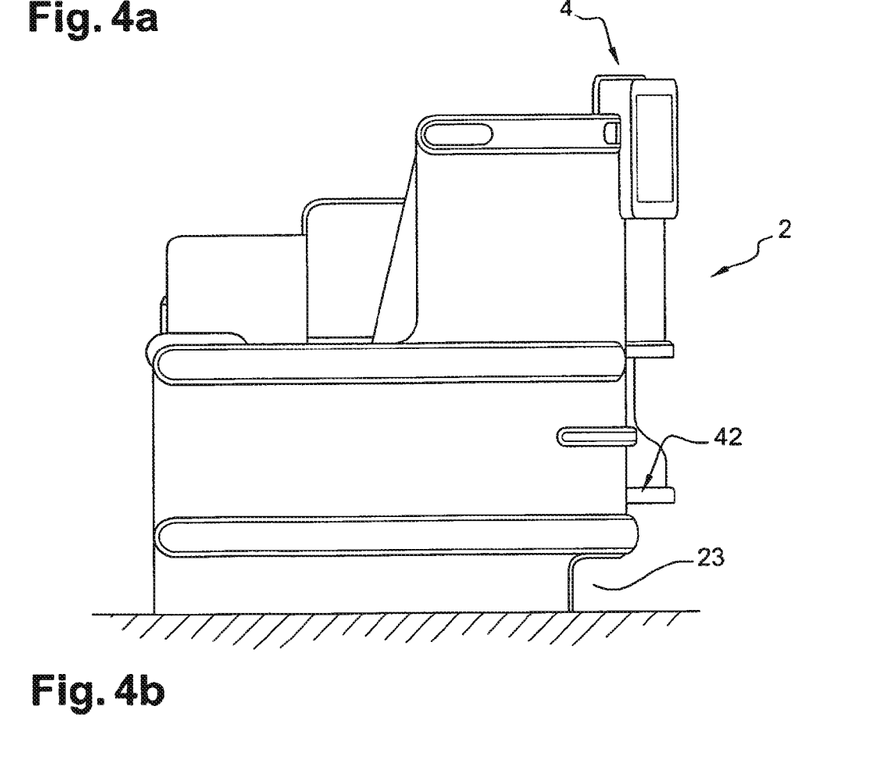

Such a crosswise volume 23 is illustrated in the embodiment shown in FIGS. 2c and 2d and in FIGS. 4a and 4b. As clearly illustrated in FIGS. 4a and 4b, the volume 23 allows the occupants of the seats to stow long objects without them obstructing the passage of the occupants or other passengers in the aisles and thus improves comfort and safety.

Other auxiliary elements are advantageously associated with the shell 21 of a block.

In particular, a separating partition 22 for the two seats 3 of a block 2, which can be seen in particular in FIGS. 2a and 2b, is arranged in front of the column 4 integrated into the block in question.

In a preferred embodiment, this partition 22 has at least one at least partially retracted position which allows the occupants of the two seats side by side to hold a conversation in good conditions, and at least one extended position in which each occupant of a seat has a degree of privacy.

In an advantageous arrangement, technical means associated with a block for the operational requirements of the seats of the said block, for example energy supply means, control or command equipment, or alternatively safety elements, are arranged between two seats of a block inside a closed structure 24 separating the two seats. Moreover, the closed structure 24 is provided with at least one removable side trim panel 241 situated on the side of the seat 3 on which the seat cushion is lowered when the seat is placed in the bed configuration and such that means for fastening the said side panel to the said structure can be accessed when the seat is in the bed position as illustrated, for example, in FIG. 2b.

In this position, the fastening means can then be easily removed and the trim panel 241 taken off by a maintenance operative in a minimum amount of time and involving a minimum of operations, and the maintenance operative is able to readily access all of the equipment arranged in the intermediate structure 24 and placed in the said intermediate structure, by design, so that they can be reached without having to take out the seat 3.

Furthermore, although the drawings illustrate perfectly symmetrical blocks 2 of two seats shown to scale in the drawings, the symmetry of the blocks or the seats with respect to their respective planes of vertical symmetry may be imperfect without going beyond the scope of the present invention.

For example, the two seats 3 of a same block 2 may have slightly different longitudinal positions or angles of convergence with the axis of the block, for example for reasons of optimizing installation or assembly, without the benefits of the invention being jeopardized.

The invention also relates to a block 2 of three seats arranged side by side.

Figure 6:
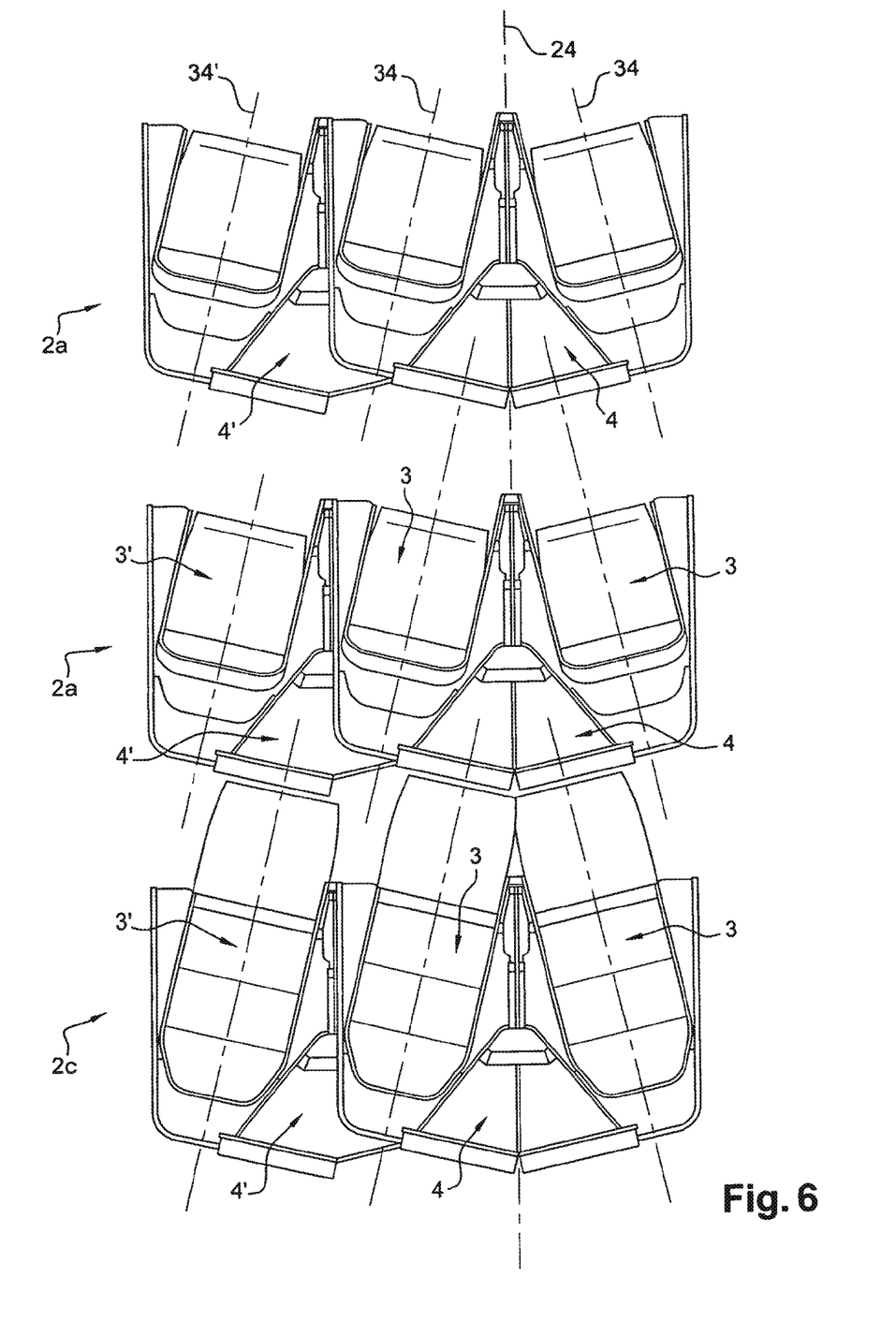
FIG. 6 shows a view from above of a set of three aligned blocks of three seats according to the invention in a passenger cabin.
Figure 7A:
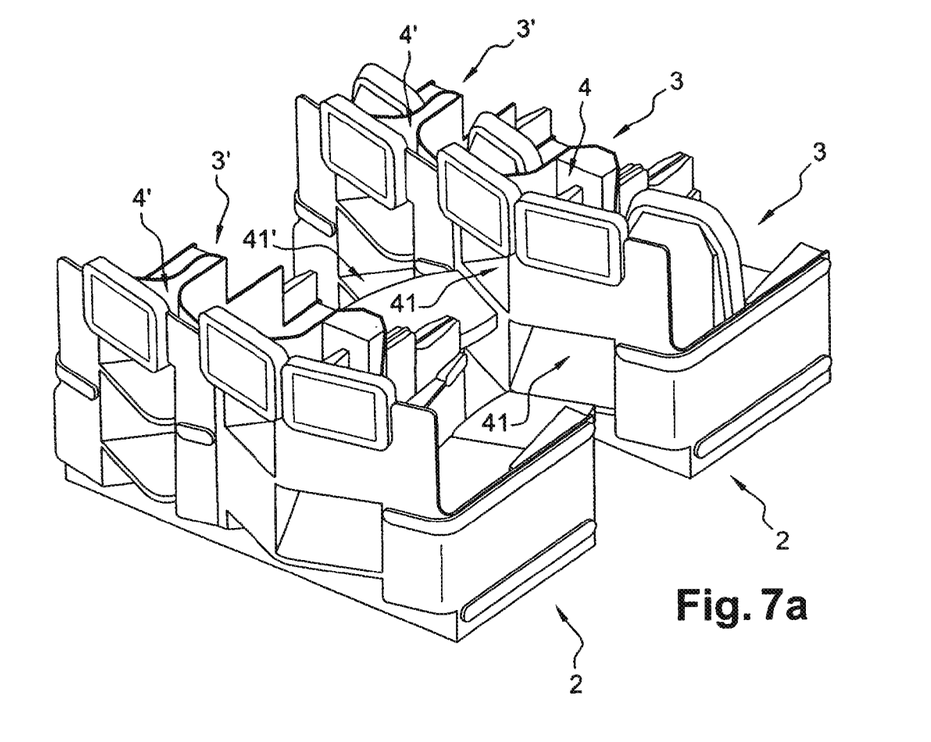
FIGS. 7a and 7b show perspective views of an example of the arrangement of a block of three seats which can be converted into beds, from behind in FIG. 7a and from the front in FIG. 7b.
Figure 7B:
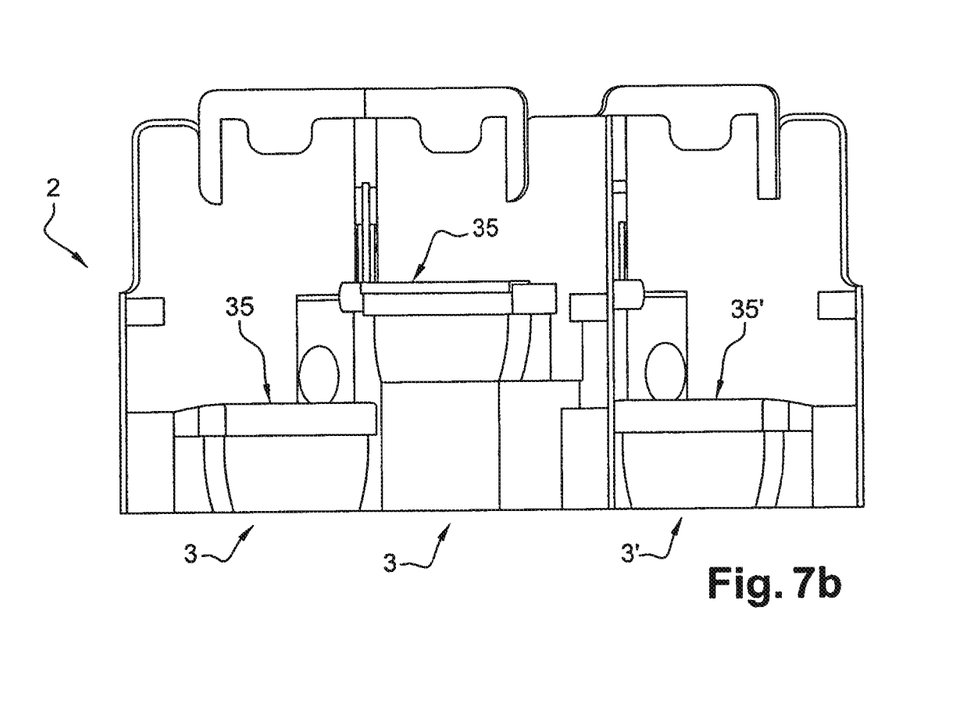

Such an arrangement of the block is shown in FIGS. 6, 7a and 7b.

In this case, two adjoining seats 3 of the three seats are arranged in a similar manner to that described for a block of two seats, in other words in particular with the longitudinal axes 34 of the said two seats converging towards the front and the said two seats being vertically offset in the bed position, as can be seen in FIGS. 7a and 7b.

The third seat 3' of the block in question is then arranged laterally on the free side of the seat 3 with the highest bed and on the other side of which the convergent seat is situated.

Furthermore, the said third seat 3' is such that:
  its longitudinal axis 34' is substantially parallel to the axis 34 of the neighbouring seat which is thus the central seat of the block of three seats;
  its bed plane 35' is preferably beneath the bed plane 35 of the neighbouring seat, a priori at a height substantially corresponding to the height of the bed plane of the seat situated on the other side of the block of three seats.

Thus, in this arrangement, when the three seats of a block are in the bed position, the bed plane of the seat situated between the two other seats, or the central seat, in the block is situated above the floor at a greater height than those of the seats situated on either side at the sides of the block.

Such a configuration makes it possible to arrange three seats abreast in a cabin with an aisle on each side of the block and allowing the occupant of the central seat to access either of the aisles without being obstructed by the occupants of the seats situated to the sides of the block.

As can be seen in FIG. 6 in a view from above of an arrangement of three blocks 2 of three seats, a secondary column 4' is arranged in the rear part of the block 2 between the central seat 3 and the seat 3' with its longitudinal axis 34' substantially parallel to the longitudinal axis 34 of the said central seat.

The arrangement of this secondary column 4' is facilitated by the angular offset of the axis 34' of the seat 3' relative to the axis 24 of the row of blocks corresponding, as in the case of the blocks of two seats, to an axis of the general plane of symmetry of the seats 3, the longitudinal axes 34 of which converge.

The secondary column 4' of a block 2 of three seats also has a hollow space making it possible to form a foot area 41' for the occupant of the corresponding seat of the block situated immediately behind the block in question and to provide an equivalent amount of comfort for the three seats in the bed position.

It will be understood that the various embodiments and possible block arrangements with blocks of two seats are also possible with blocks of three seats.

The invention also relates to an arrangement of a cabin 1 of a transport vehicle for transporting passengers, for example a cabin of a land vehicle such as a coach or a train, a sea transport vehicle such as a surface ship or an aircraft such as an aeroplane, in which arrangement of the seats 3 for the passengers at least one line of at least two blocks of three seats 3 in accordance with the above-described blocks are arranged in lines of blocks 2.

Figure 3:
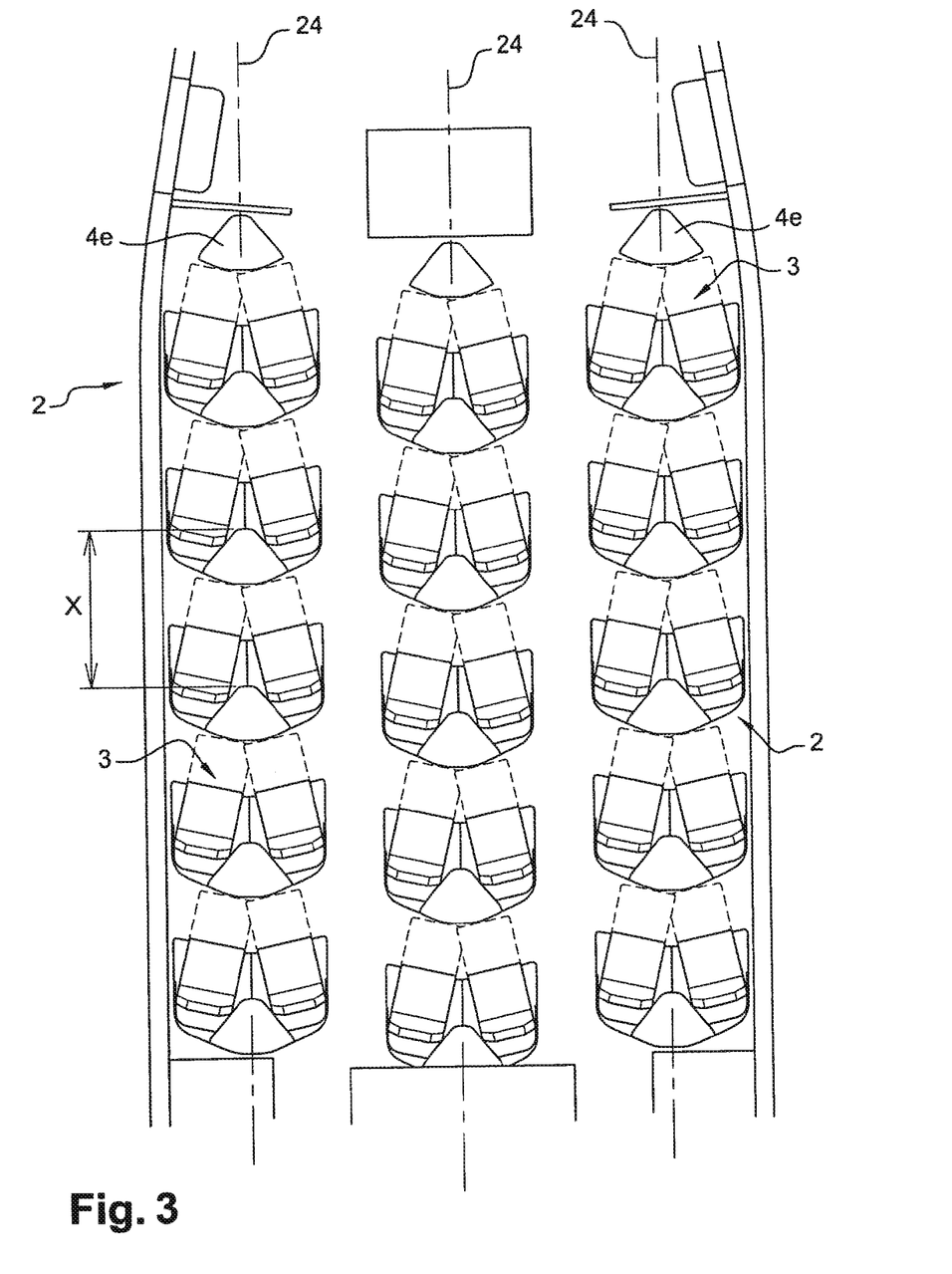
FIG. 3 shows an example of a layout of an aeroplane cabin according to the invention.

FIG. 3 illustrates such an example of an arrangement of an aeroplane cabin having three lines of five blocks 2 of two seats, all oriented such that the passengers are in the chair configuration, sitting facing the front of the aeroplane, these values of both the number of lines and the number of blocks per line and this orientation being random for the purpose of illustration and implying no limitation on the invention.

For industrial and economic reasons, the different blocks are preferably identical or differ only in secondary characteristics, for example because of a specific position or environment in the cabin. However, cabin arrangements which combine blocks of two seats and blocks of three seats are possible and can prove advantageous when the width of a cabin changes, as is the case towards the front or the rear of an aeroplane fuselage.

In such an arrangement, the pitch X of the seats 3, in other words also the pitch of the blocks 2 of seats, corresponding to the distance between two successive blocks separating a reference point of the seats, is determined by the length L0 of the bed less the depth P of the foot areas 41, and by the angle formed by the axis 34 of the seats relative to the axis 24 of the line of blocks having a multiplying effect on the distance required by the cosine of the said angle.

The blocks are preferably formed and arranged in the cabin in such a way that the seat 3 of a block which has the lowest bed plane 35 relative to the floor of the cabin in the bed configuration is situated next to an aisle.

Thus, when the occupant of the highest bed needs to step over the lowest bed to access an aisle, this movement is made much easier, especially because, in its front part, the lower bed plane is partially beneath the upper bed plane, hence reducing the width to be stepped over.

This situation occurs in the case of the lines of blocks located to the sides of the cabin, along the walls of the fuselage in the case of FIG. 3, the passenger occupying the bed next to the wall being able to access the aisle only by stepping over the bed next to the aisle.

This limitation also occurs in a layout employing blocks of three seats or alternatively a configuration (not shown) which has two lines of blocks without an aisle between the said two lines, for example in a configuration of a fuselage with a width that allows four lines of blocks to be installed, two lines of which are placed close to each other so that they almost touch and are bordered by an aisle on each side of the said two lines placed close together.

In order to allow the seats 3 of the first block 2 at the front of a line of blocks to benefit from the bed configuration with the desired bed length, a column 4e, similar to the column 4 of a block 2 but not integrated into a block, is arranged in the cabin 1 at the location that this column would have if another block was located in front of the block in question.

This column 4e may be isolated, as in the example illustrated in FIG. 3, or advantageously be integrated into other fittings, for example separating partitions of the cabin, cloakrooms or storage units.

The rearmost block of a line of blocks is also in a particular situation, as there is no other block behind it.

The column of this block is advantageously used to create storage spaces which may or may not be integrated into fittings in a rear part of the cabin 1.

In an embodiment, the foot recesses 41 in the columns 4 have depths P of approximately 500 mm and the seat pitch X is 1524 mm (60 inches), which makes it possible to form flat beds of at least 1800 mm with a seat pitch generally associated with seats limited to the relaxed configuration.

A layout comprising five blocks per line, such as the layout shown in FIG. 3, thus requires a cabin length 1380 mm less than that which would be necessary to install an equivalent number of flat beds of the same length, using the known seats in the current layouts.

It will be noted that this saving in bed length along with a reduced seat pitch is achieved at the cost of wider blocks of seats owing to the presence of the column 4 between the two seats 3 of a block 2.

This widening is, however, compensated by a combination of the shapes chosen for the different elements forming a block.

On the one hand, when viewed from above the column 4 has an overall triangular section, with the apex pointing forwards, which shape is made possible by the convergence of the axes 34 of the seats of each block 2.

This shape makes it possible to limit the required spacing at the seat backs 32 in the chair configuration, the seat backs 32a being, as illustrated for the front block 2a in FIG. 1, in a relatively advanced position in which the column has a relatively small width.

On the other hand, the seat backs 32 of the seats 3 have a reduced width in an upper part of the seat back in the chair configuration. The area with this reduced width corresponds, for an adult of standard body shape, to a headrest area which does not require as great a width as a back area.

Thus, when the seat back is inclined backwards so as to place the seat in the relaxed configuration or in the bed configuration, the upper part of the seat back 32 is capable of assuming a position further back than in the chair configuration without interfering with the column 4.

Thus, as illustrated in FIG. 1, at the intermediate block shown in the bed configuration, the shape of the seat back 32c is adapted to the presence of the column and also makes it possible to reduce the maximum width of the shell 21, on the side opposite the column 4, from the width that the shell 21 would have if the seat back 32 had a constant width.

In an embodiment, without making any still possible concession on the width of the seat cushion of the seats, in other words preserving a comfortable width of 533 mm (21 inches) for the seat cushion 31, the width of the blocks 2 of two seats is increased from 1372 mm (54 inches), in a conventional configuration with two seats side by side with no separation and parallel axes, to a width of 1448 mm (57 inches).

Analyses of the layouts in various aeroplane cabins show that there is usually no particular problem in increasing the width of the blocks, by 76 mm in the exemplary embodiment, when the cross section of the fuselage means that the width of the aisle or aisles between the lines of blocks needs to be reduced as a consequence.

In a particular embodiment of the invention, the blocks are produced so as to conform to different bed lengths.

By adapting the dimensions of the leg rest and/or of movable panels between the seat cushion 31 and the foot area 41, and by adapting the pitch X of the blocks, the length of the beds in a block can be easily increased or reduced.

This advantage allows in particular a cabin with a greater degree of comfort to be provided or the configuration of a cabin to be optimized by offering, without undermining the design of the blocks themselves, some seats with beds that are longer than average and/or beds which are shorter than average by modifying the pitch X with which the blocks 2 are installed.

This solution proves to be particularly advantageous when the length of a cabin, which may be determined by other factors (exits, fixtures of the aeroplane, etc.), does not correspond exactly to a whole number of blocks arranged at a standard pitch and when some seats may be "lengthened" in order to meet exceptional needs for some larger-than-average passengers.

The invention thus makes it possible to produce very comfortable seats in the bed configuration with a pitch between the seats that is substantially less than the bed length, and to fit out cabins for passengers, in particular aeroplane cabins, with a greater number of seats than when they are fitted out with the known seats for a given bed length and a given cabin, or to reduce the length of a cabin for a given number of seats and a given bed length.

The invention claimed is:

1. A seating arrangement comprising:
a first block (2) comprising a first seat; and a second seat adjoining said first seat,
said first and second adjoining seats (3) each including elements that include a seat cushion (31) and a seat back (32), and
each seat being convertible, individually, by a relative movement of said elements including the seat cushion (31) and the seat back (32) between i) a chair configuration in which an occupant of the seat is in a seated position, and ii) a bed configuration in which the elements of the seat form a bed plane (35) and in which an occupant of the seat is stretched out substantially flat and substantially horizontally,
the first and second seats (3) being arranged side by side and oriented substantially in a same direction,
wherein, each of the at least first and second seats (3) is associated with a foot area (41) situated in front of each seat in the bed configuration and in an extension of each bed plane,
a longitudinal axis (34) of each of the at least first and second seats (3) in the bed configuration converges towards a convergence point situated in a vertical plane of symmetry of a second similar block in front of said seats,
each foot area (41) of the at least first and second seats (3) comprises a rest surface (42) substantially in a horizontal plane of the second block said foot areas (41) being vertically offset such that a first of the rest surfaces (42) is situated at a height of the bed plane (35) of the first seat, and a second of the rest surfaces is situated at a height of the bed plane (35) of the second seat, the height of the bed plane of the first seat and the height of the bed plane of the second seat being different,
the rest surfaces (42) of the foot areas (41) of the at least first and second seats (3) are at least partially superposed, one over the other, in a vertical projection, and
when the at least first and second seats (3) are both in the chair configuration, the seat cushion of the first and second seats are situated at the same height and, when the at least first and second seats (3) are both in the bed configuration, the bed plane (35) of one of said at least first and second seats is situated at a different height, relative to a reference surface corresponding to a cabin floor when said blocks are installed in a cabin, from the bed plane of the other of said at least first and second seats.

2. The seating arrangement according to claim 1, further comprising:
in a rear part of the first block substantially between the seat backs (32) of said at least first and second seats (3), when said at least first and second seats are in the chair configuration, a substantially vertical column (4),
said column covering in a vertical projection foot areas (41) for seats of a similar third block placed behind, in a same direction, and substantially with a same axis as the first block (2),
the third block placed at a separating distance behind the first block termed the block pitch X, which is less than a desired length L0 of the seats of said third block when in the bed configuration.

3. The seating arrangement according to claim 2, wherein the bed plane (35) in the bed configuration is vertically above a position of the seat cushion (31) of the seat in the chair configuration for at least one of the seats (3, 3').

4. The seating arrangement according to claim 2, wherein the bed plane (35) in the bed configuration is vertically below a position of the seat cushion (31) of the seat in the chair configuration for at least one of the seats (3).

5. The seating arrangement according to claim 2, wherein, when the at least first and second seats (3) are in the bed configuration,
the bed plane (35) of one of the first and second seats is vertically above a position of the seat cushions (31) of the first and second seats in the chair configuration, and
the bed plane (35) of the other of the first and second seats is below the position of the seat cushions (31) of the first and second seats in the chair configuration.

6. The seating arrangement according to claim 2, wherein each foot area (41) covered by the column further comprises a rest surface (42) for the seats of the third block, where these rest surfaces are separated from each other and open in a direction of a rear of the first block (2).

7. The seating arrangement according to claim 6, wherein the bed plane (35) of the seat in the bed configuration is determined by the seat cushion (31) of said seat, the seat back (32) of said seat, and a leg rest (33) of said seat, the plane being extended by the rest surface (42) of the foot area (41) of the second block which is placed in front of the first block (2), or of an isolated column having characteristics similar to the column of the first block,
said seat cushion, said seat back, and said leg rest being aligned substantially horizontally and in the bed plane to form the bed configuration.

8. The seating arrangement according to claim 6, wherein the bed plane (35) of a seat (3, 3') in the bed configuration is determined by the seat cushion (31) of said seat, the seat back (32) of said seat, a leg rest (33) of said seat and the rest surface (42) of the foot area (41) of said seat, wherein said leg rest penetrates a hollow space of a similar second column (4, 4') comprised within the second block which is placed in front of the first block (2), or of an isolated column having characteristics similar to the column of the first block, said seat cushion, seat back, leg rest and rest surface being aligned substantially horizontally and in the bed plane to form the bed configuration.

9. The seating arrangement according to claim 7, wherein the bed planes (35) of the two adjacent seats (3, 3') of any block, when said two seats are both in the bed configuration, are vertically offset by a distance of approximately 330 mm.

10. The seating arrangement according to claim 2, wherein the column (4) integrates technical equipment which can be used by the occupants of the seats of the third block situated behind the first block (2).

11. The seating arrangement according to claim 4, further comprising a closed structure (24) between the two seats (3, 3'), the closed structure further comprises a side trim panel (241) situated on a side of said closed structure corresponding to one of said seats, wherein, when one of the seat cushions is lowered during the conversion into the bed configuration, said side trim panel is removable.

12. The seating arrangement according to claim 1, further comprising: in a rear part of the first block, a recess (23) forming a storage space between the cabin floor surface and the height of the lowest bed plane, wherein the recess runs across the width of said first block.

13. The seating arrangement according to claim 3, wherein the first block further comprises:

a third seat, wherein the third seat (3') has a longitudinal axis (34') substantially parallel to the longitudinal axis of one of the first and second seats closest to the third seat, said closest seat (3) being the seat having the seat cushion which moves up when the seat is converted into the bed configuration.

14. The seating arrangement according to claim 8, wherein the bed planes (35) of the first and second seats (3, 3'), when said two seats are both in the bed configuration, are vertically offset by a distance of approximately 330 mm.

15. The seating arrangement according to claim 6, wherein the bed plane (35) of the seat in the bed configuration is determined by the seat cushion (31) of said seat, the seat back (32) of said seat, and a leg rest (33) of said seat, the bed plane being extended by the rest surface (42) of the foot area (41), said seat cushion, said seat back, said leg rest, and the rest surface being aligned substantially horizontally when in the bed configuration.

16. A cabin (1), or a part of a cabin, for transporting passengers, comprising:

at least one line of at least a first and second block (2), each block further comprising at least first and second seats (3, 3'), wherein, in each of said blocks, each seat (3) of a block (2) is convertible individually, by a relative movement of elements (31, 32, 33) of the seat, between a chair configuration in which an occupant of the seat is in a seated position and a bed configuration in which the elements of the seat form a bed plane in which an occupant of the seat is stretched out substantially flat and substantially horizontally, wherein, for each of said blocks, the seats (3, 3') are arranged side by side and oriented substantially in a same direction, said first block being arranged behind the second block in a same orientation, wherein the blocks are separated, in a direction of the line of blocks, by a pitch X characterizing the distance between a reference point of each of the blocks (2), wherein, for each of the seats (3, 3') of the first block (2), when in the bed configuration, the bed plane (35) of each seat (3) is extended by a foot area (41) situated in front of said seat, inside the second block, in a built-in space, termed a column, between seat backs (32) of the seats (3, 3') of said second block, said foot areas each comprising a rest surface (42) substantially in a horizontal plane of the column at the height of each bed plane, wherein the bed planes (35) of the two adjacent seats (3) of the first block (2) are at different heights above a floor of the cabin (1) such that the rest surfaces (42) of the foot areas (41) of said two adjacent seats are at least partially superposed.

17. The cabin according to claim 16, wherein, the first seat of each block, when in the bed configuration, is situated vertically closer to the floor of the cabin (1) than the second seat in the bed configuration, and the first seat (3, 3') of each block (2) is situated on a side of the block (2) which is bordered by an aisle.

18. The cabin according to claim 16, wherein the second block (2) is preceded, a direction of orientation of the seats (3), by a second built-in column (4e), wherein the second column is similar to the column of the second block (2).

19. A vehicle comprising the cabin or the part of the cabin according to claim 16, said vehicle belonging to one of the categories of transporting passengers by land, sea or air.

* * * * *